US007300190B2

(12) United States Patent
Nitawaki et al.

(10) Patent No.: US 7,300,190 B2
(45) Date of Patent: Nov. 27, 2007

(54) VEHICLE DOOR HANDLE DEVICE

(75) Inventors: Masakatsu Nitawaki, Miyazaki (JP); Hitoshi Kawano, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 106 days.

(21) Appl. No.: 11/069,763

(22) Filed: Mar. 1, 2005

(65) Prior Publication Data

US 2005/0231364 A1 Oct. 20, 2005

(30) Foreign Application Priority Data

Mar. 30, 2004 (JP) ............................ 2004-099510
Mar. 30, 2004 (JP) ............................ 2004-099516

(51) Int. Cl.
*B60Q 1/00* (2006.01)

(52) U.S. Cl. ...................................... 362/501; 362/100

(58) Field of Classification Search ................ 362/501, 362/100, 802, 276, 119; 16/412; 340/545.1, 340/426.28
See application file for complete search history.

(56) References Cited

U.S. PATENT DOCUMENTS 6,075,294 A 6/2000 Van den Boom et al.
6,648,493 B2 * 11/2003 Klein ......................... 362/501
6,740,834 B2 5/2004 Sueyoshi et al.
6,768,413 B1 * 7/2004 Kemmann et al. ......... 340/5.72
6,769,154 B1 8/2004 Klein et al.
6,847,289 B2 * 1/2005 Pang et al. ............ 340/426.28
6,933,831 B2 * 8/2005 Ieda et al. ................. 340/5.72
2001/0004233 A1 * 6/2001 Suparschi et al. .......... 340/426
2002/0125994 A1 9/2002 Sandau et al.
2002/0152582 A1 10/2002 Sueyoshi et al.

FOREIGN PATENT DOCUMENTS

| | | |
|---|---|---|
| DE | 19617038 | 11/1997 |
| EP | 1067257 | 1/2001 |
| WO | WO 9928170 | 6/1999 |
| WO | WO 0107736 | 2/2001 |

* cited by examiner

*Primary Examiner*—Jong-Suk (James) Lee
*Assistant Examiner*—Robert May
(74) *Attorney, Agent, or Firm*—Carrier, Blackman & Associates, P.C.; William D. Blackman; Joseph P. Carrier

(57) ABSTRACT

A capacitive sensor unit of a door handle device is universally adaptable to door handles of various different designs. The vehicle door handle device, having an electrostatic capacitance detection circuit incorporated in a grip portion thereof, includes a sensor unit having a detection circuit insert molded in a plastic member, a hollow cavity formed in the grip portion to receive the sensor unit, and a retaining member made of plastic material for retaining the sensor unit in the cavity. By suitably changing the shape of the retaining member, the sensor unit can be adapted to door handles of different designs.

13 Claims, 5 Drawing Sheets

VEHICLE DOOR HANDLE DEVICE

TECHNICAL FIELD

The present invention relates to a vehicle door handle device, and in particular to a vehicle door handle device incorporated with a capacitive sensor for determining the intention of the user to lock or unlock the door.

BACKGROUND OF THE INVENTION

The so-called smart entry system is already put into practical use in vehicle doors. According to the smart entry system, once a capacitive sensor incorporated in the door handle has detected the user touching the door handle in such a manner that suggests the intention of the user to open the door, an ID code matching is made between a card key carried by the user and an onboard control unit, and the door may be unlocked only when an ID code matching is detected.

In a known door handle device for such a smart entry system, a circuit board for detecting a change in an electrostatic capacitance is incorporated in the door grip that is held by the user in his/her effort to open the door. Such a door handle device is disclosed, for instance, in U.S. Pat. No. 6,740,834 assigned to the same assignee. The contents of this patent are hereby incorporated by reference.

In conventional door handle devices such as the one disclosed in the aforementioned US patent, the circuit board for detecting changes in the capacitance is individually designed for each vehicle model. Therefore, when an attempt is made to manufacture door handle devices for different vehicle models in the same manufacturing line, the management of the required component parts becomes unacceptably complex.

To eliminate such an inconvenience, it is conceivable to design a universal capacitive sensor unit and apply the capacitive sensor unit of the same design to different vehicle models. However, it has not been possible because it necessitates the door handle to be adapted to the shape of the sensor unit.

A door handle is required to have a relatively large and uniform thickness to avoid any sink marks or other flaws to be produced on the outer surface and to give the door handle a required mechanical strength. Therefore, it is not practical to fit a common sensor unit to door handles of various different designs. In particular, if any gap is formed between the sensor unit and the inner wall of the cavity in the door handle, it means that an air layer having a low dielectric coefficient is interposed between the surface which the user touches and a detection electrode, and this reduces the detection sensitivity of the capacitive sensor. As can be readily appreciated, a vehicle door handle is designed as a part of the overall design of the vehicle body, and may significantly vary in size and shape for each particular design of the vehicle body.

It is sometimes desired that a metallic component to be placed on the outer surface of the door handle or apply a metallic plating to a part of the outer surface of the door handle for aesthetic reasons, In such a case, when a part of the metallic part is brought close to the capacitive sensor, the metallic part may form a part of the electric circuit for the capacitive sensor so that the capacitive sensor may be inadvertently activated when a part well outside the grip portion is touched. It means that the door may be unlocked simply by slightly touching the outer face of the door handle even without the user intending to unlock the door, and this obviously is not desirable.

BRIEF SUMMARY OF THE INVENTION

In view of such problems of the prior art, a primary object of the present invention is to provide a vehicle door handle device that allows a universal sensor unit to be readily adapted to door handles of different designs.

A second object of the present invention is to provide a vehicle door handle device that can ensure a required sensitivity of the capacitive sensor incorporated in the door handle without regard to the shape of the door handle.

A third object of the present invention is to provide a vehicle door handle device that allows the door handle to be designed without requiring to consider the shape of the capacitive sensor.

A fourth object of the present invention is to provide a vehicle door handle device that ensures the capacitive sensor to properly operate under a prescribed condition even when the door handle is provided with a metallic component on the outer surface thereof or is partly applied with a metallic plating.

According to the present invention, at least part of such objects can be accomplished by providing a vehicle door handle device, comprising: a door handle main body elongated in a first direction and defining a hollow interior, the hollow interior having an opening on one side thereof; a retaining member having an outer profile that fits into the hollow interior of the door handle main body from the opening of the hollow interior, and a hollow interior; and a sensor unit having an outer profile that fits into the hollow interior of the retaining member.

According to another representation of the present invention, the vehicle door handle device, having an electrostatic capacitance detection circuit incorporated in a grip portion thereof, comprises a sensor unit having a detection circuit insert molded in a plastic member, a hollow cavity formed in the grip portion to receive the sensor unit, and a retaining member made of plastic material for retaining the sensor unit in the cavity.

Because the gap between the inner wall of the cavity formed in the door handle main body for receiving the sensor unit and the sensor unit is filled by the retaining member which is typically made of plastic material having a relatively high dielectric coefficient, an air layer having a low dielectric coefficient would not be interposed between the sensor unit and the outer surface of the door handle main body or any other member that forms the door handle jointly with the door handle main body. Therefore, the sensor unit can be readily adapted to door handles of various different designs without reducing the detection sensitivity of the capacitive sensor.

For the convenience of handling and protection of the internal circuit, the sensor unit may comprise a detection circuit that is insert molded in a plastic member. Typically, a cover member closes the opening of the hollow interior of the door handle main body so as to define an outer profile of a door handle jointly with the door handle main body. The sensitive surface for the sensor unit may be defined on the surface of the door handle main body and/or cover member.

According to a preferred embodiment of the present invention, the opening of the hollow interior of the door handle main body faces downward, and the cover member comprises a lower cover member that covers the opening of the hollow interior of the door handle main body that faces downward. Thereby, the sensor unit can be easily protected from the adverse influences of the elements. Preferably, the door handle main body is provided with a U-shaped cross section defining the opening of the hollow interior, and the retaining member is provided with a U-shaped cross section, the retaining member being received in the door handle main body with the open end of thereof facing inward in the hollow interior of the door handle main body. According to a particularly preferable embodiment of the present invention, a cover member closes the open end of the hollow interior of the door handle member so as to jointly define an outer profile of a door handle.

The retaining member can be conveniently provided with a retaining portion for retaining an electric component. This allows an electric component to be mounted without significantly changing the design of the door handle main body, and helps to accommodate electric components of different designs simply by adapting only the retaining member. Typically, the electric component consists of an illuminating lamp that may consist of an incandescent lamp, light emitting diode or any other light emitting component for illuminating a part of a door panel surface opposing the door handle main body.

When the door handle main body or a cover member that forms a vehicle door handle jointly with the main body is fitted with a metallic component on an outer surface thereof or consists of a metallic member, it could form a part of the electric circuit for the capacitive sensor so that the capacitive sensor could be inadvertently activated when a part well outside the grip portion is touched. To avoid such a problem, the metallic component may be commonly electrically grounded with the electric component.

According to a preferred embodiment of the present invention, a hole is jointly defined by the door handle main body and retaining member, and the illuminating lamp is held in the hole jointly defined by the door handle main body and retaining member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
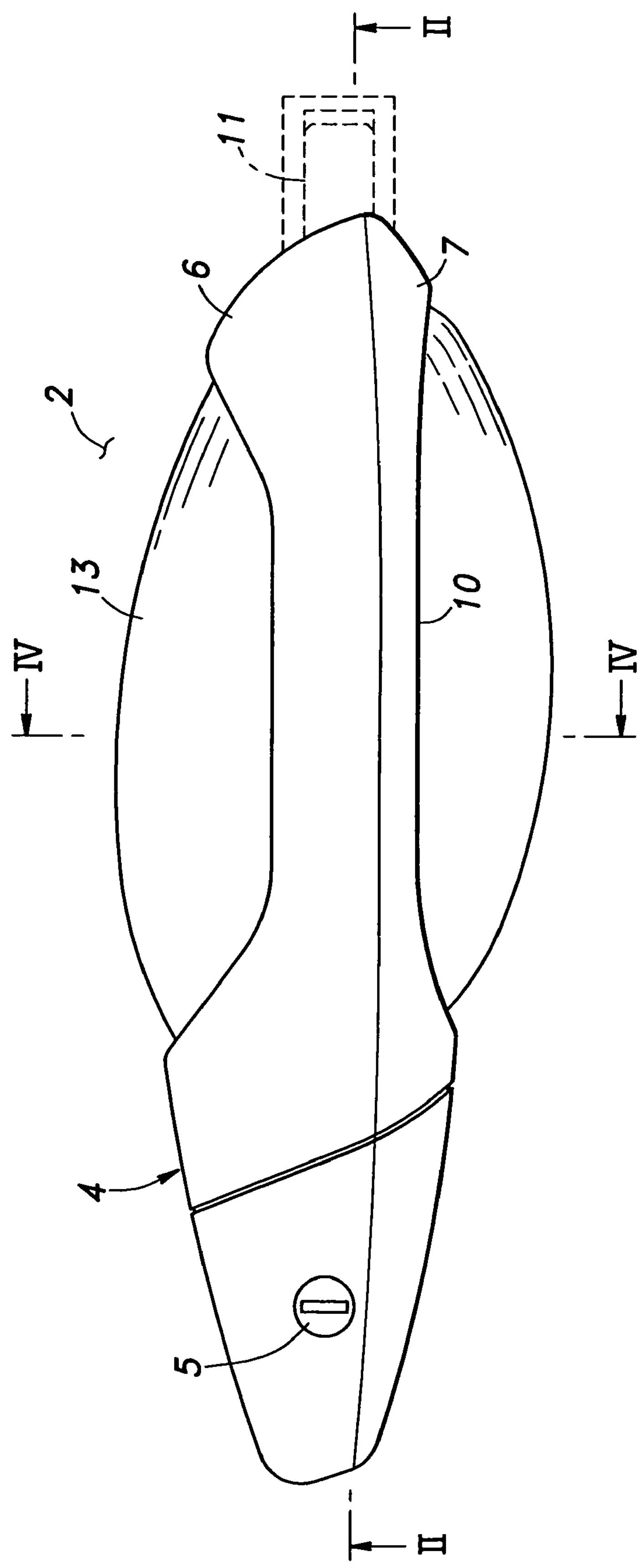
FIG. 1 is a fragmentary side view of a side door fitted with a device embodying the present invention.
Figure 2:
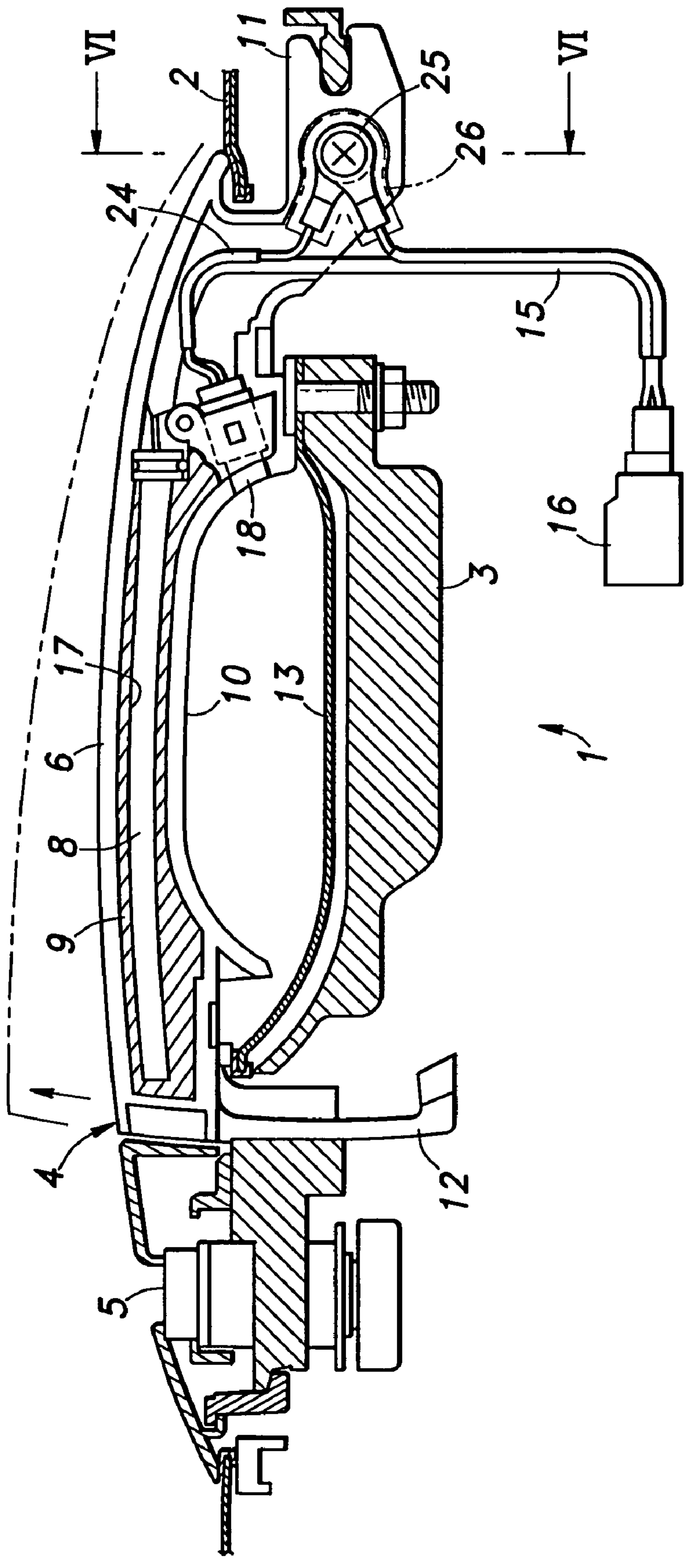
FIG. 2 is a sectional view taken along line II-II of FIG. 1 with the lower cover removed.
Figure 3:
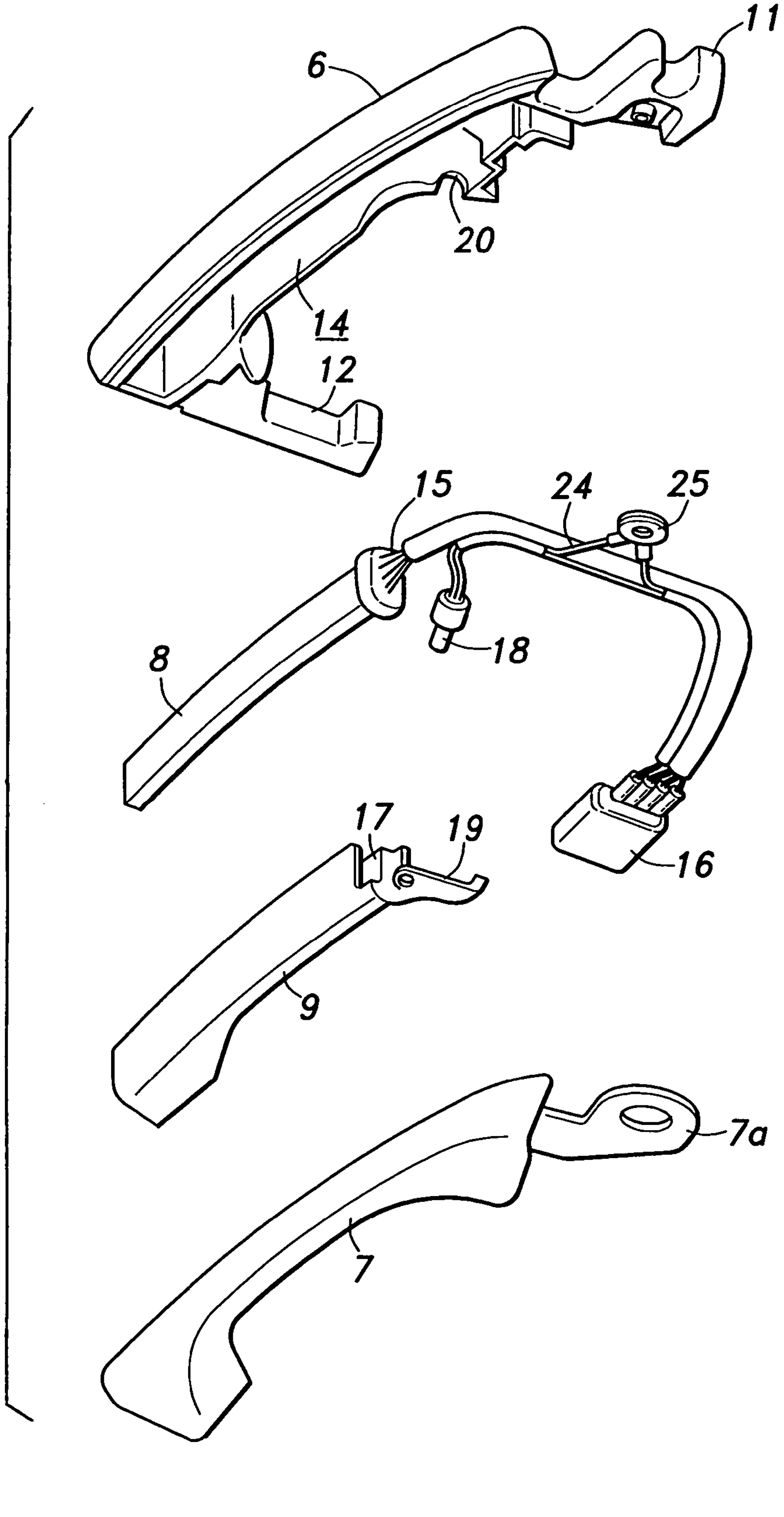
FIG. 3 is an exploded perspective view of the main components of the device of the present invention.

FIGS. 1 to 3 show the overall structure of a door handle device embodying the present invention. This door handle device 1 is attached to the outer face of a door outer panel 2 of a vehicle side door via a handle base 3 which is fixedly attached to the inner face of the door outer panel 2, and comprises a door handle 4 extending along the fore-and-aft direction of the vehicle body and a key cylinder 5 provided on the rear end of the door handle 4.

The door handle 4 comprises a main body 6 made of plastic material, a lower cover 7 made of plastic material and metallic plated, a sensor unit 8 including a circuit board for detecting a change in capacitance which is insert molded in a plastic member, and a retaining member 9 for retaining the sensor unit 8 in the main body 6. If desired, the lower cover 7 may be entirely made of metallic material or the door handle main body 7 may be metallic plated.

The door handle 4 consists of a grip portion 10, a hinge portion 11 integrally formed at the front end of the grip portion 10 and a guide portion 12 integrally formed at the rear end of the grip portion 10. The grip portion 10 includes an inner surface extending along the fore-and-aft direction of the vehicle body and slightly curved so as to present a convex surface outwardly, and is provided with a vertically elongated cross section. The grip portion 10 is relatively narrower in an intermediate portion thereof along the fore-and-aft direction of the vehicle body as shown in FIG. 1. The hinge portion 11 is pivotally attached to a front end portion of the handle base 3 in such a manner that the door lock is unlatched as the guide portion end of the door handle 4 is pulled sideways away from the outer face of the door outer panel 2. As the function and structure of the door handle 4 in connection with the opening and closing of the door are not relevant to the essential point of the present invention, the detailed description of these aspects are omitted from the description.

The part of the door outer panel 2 opposing the grip portion 10 is provided with a recess 13 to allow the fingers of the user to be inserted between the grip portion 10 and door outer panel 2.

Figure 4:
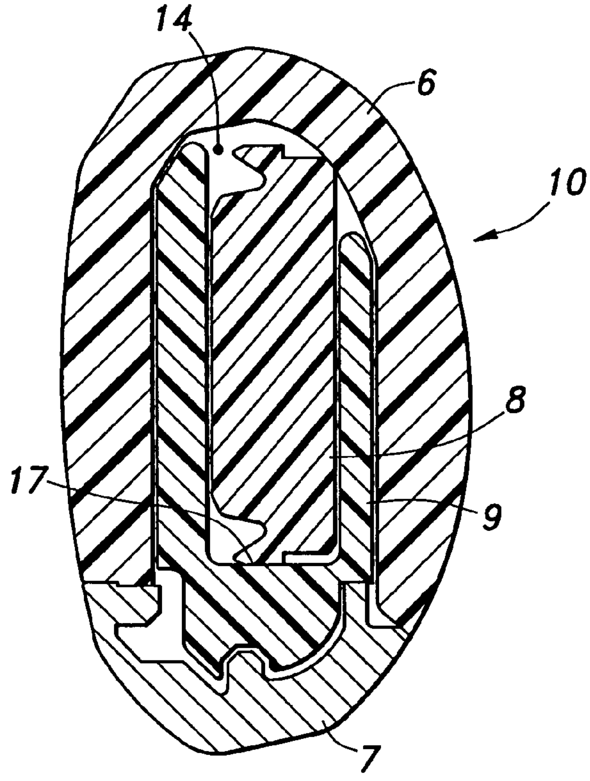
FIG. 4 is a sectional view of the grip portion taken along line IV-IV of FIG. 1.
Figure 5:
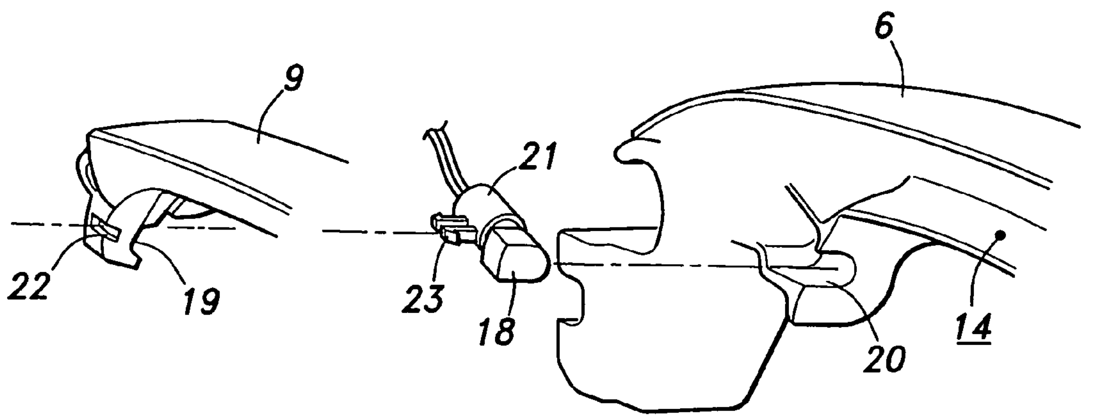
FIG. 5 is an exploded perspective view of the mounting arrangement for the illuminating lamp.

The part of the main body 6 corresponding to the grip portion 10 is provided with a cavity 14 having a U-shaped cross section and an open bottom end over the entire length thereof as illustrated in FIG. 4. The open bottom end of this cavity 14 is closed by a lower cover 7. In other words, the main body 6 and lower cover 7 are bonded to each other so as to jointly form a hollow shell or the door handle 4.

The sensor unit 8 is provided with an elongated plate member having a slight curve, and a plurality of lead wires 15 extend out of a longitudinal end thereof. The terminal ends of these lead wires 15 terminate at a connector 16.

The retaining member 9 is provided with an outer face that closely contacts the inner surface of the cavity 14 formed in the grip portion 10 and a retaining groove 17 having a U-shaped cross section and an open upper end over the entire length of the retaining member 9. The depth and width of the retaining groove 17 are selected so as to snugly and closely receive the sensor unit 8 therein. This nesting structure gives an adequate mechanical strength and rigidity to the grip portion 10 even when the wall thickness of the grip portion 10 is relatively small.

The parts of the retaining member 9 and main body 6 corresponding to the front end of the grip portion 10 are provided with retaining portions 19 and 20 for retaining an illuminating lamp 18 that illuminates the recess 13 of the outer panel 2 opposing the grip portion 10. The retaining portion 19 of the retaining member 9 is formed with a rectangular opening 22 that engages resilient pawls 23 projecting from the outer face of the illuminating lamp 18 so that the illuminating lamp 18 may be temporarily retained by the retaining member 9.

Therefore, when the retaining member 9 is pushed into the cavity 14 of the main body 6 with the illuminating lamp 18 temporarily retained by the retaining member 9, the illuminating lamp 18 is fixed in position by being retained between the retaining portions 19 and 20 of the main body 6 and retaining member 9. The outer periphery of the illuminating lamp 18 is fitted with a rubber seal member 21 so that intrusion of moisture into the grip portion 10 is prevented and the illuminating lamp 18 is protected from vibrations at the same time.

Figure 6:
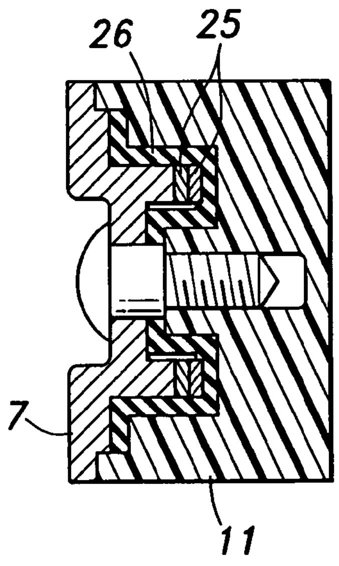
FIG. 6 is a fragmentary sectional view taken along line VI-VI of FIG. 2.

The lead wires of the illuminating lamp 18 includes a ground wire 24 which is interrupted in an intermediate part thereof, and the two ends of the ground wire on either side of the interruption are commonly fitted with a crimped terminal 25 which is fixedly attached to the front end portion 7*a* of the lower cover 7 located adjacent to the hinge portion 11 of the main body 6 via a rubber seal member 26 as illustrated in FIG. 6. Thereby, on account of the fact that the front end portion 7*a* of the lower cover 7 is made of a metallic member, provided with a metallic plating layer or otherwise rendered electro-conductive, the metallic plate layer of the lower cover 7 is grounded, and the electrostatic capacitance would not change even when the user touches the metallic part. This prevents the inadvertent activation of the device. Also, because the metallic part of the door handle 4 is grounded via the ground wire 24 of the illuminating lamp 18, there is no need for a separate ground wire for grounding the metallic part of the door handle 4.

The subassembly of the door handle 4 can be completed by placing the retaining member 9 incorporated with the sensor unit 8 into the cavity 14, closing the open end of the cavity 14 with the lower cover 7 and securing appropriate points of the main body 6 with fasteners such as threaded bolts. By thus incorporating the sensor unit 8 in the door handle 4 via the retaining member 9, it is possible to use a common sensor unit for door handles of different designs simply by changing only the retaining member 9.

The configuration of the retaining member 9 was selected mainly so as to give a required rigidity to the grip portion 10 in the foregoing embodiment, but may also be selected in such a manner as to fill the whole interior of the door handle 4 and increase the overall rigidity of the door handle 4.

The open end of the cavity 14 of the main body 6 and the open end of the retaining groove 17 of the retaining member 9 faced opposite to each other and the sensor unit 8 was fitted in the retaining member 9 before the retaining member 9 was placed in the main body 6 in the foregoing embodiment. However, it is also possible to face the open end of the retaining groove 17 of the retaining member 9 in the same direction as the open end of the cavity 14 of the main body 6, and place the retaining member 9 in the main body 6 before fitting the sensor unit 8 into the retaining member 9.

Figure 7:
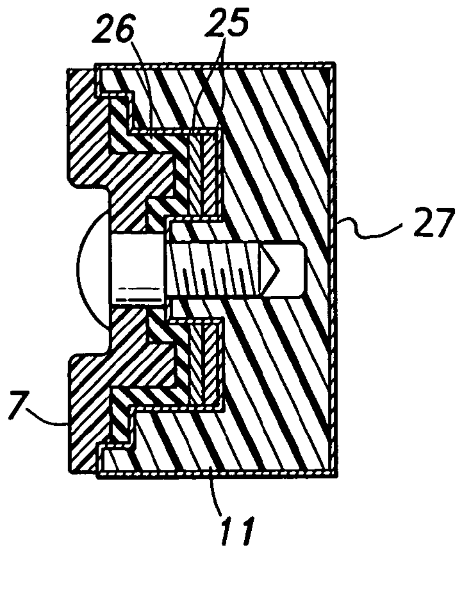
FIG. 7 is a view similar to FIG. 6 showing an alternate embodiment of the present invention.

FIG. 7 shows an alternate embodiment of the present invention in which the door handle main body 6 is provided with a metallic plating layer 27. In this embodiment, the metallic plating layer 27 is commonly grounded with the ground wire 24 while the lower cover may be or may not be electro-conductive.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application are incorporated in this application by reference.

The invention claimed is:

1. A vehicle door handle device, comprising:

a door handle main body elongated in a first direction and defining a main body hollow interior, the main body hollow interior having an opening on one side thereof;

a cover separate from and independent of the main body, the cover elongated in the first direction and fixed to the main body so as to close the opening on the one side of the main body;

a retaining member separate from and independent of the main body and cover, the retaining member having an outer profile that fits into the main body hollow interior from the opening of the hollow interior, the retaining member having a retaining member hollow interior; and a sensor unit separate from and independent of the retaining member, the sensor unit having an outer profile that is sized and shaped to closely fit within the retaining member hollow interior and to adjoin and confront an inner surface of the main body hollow interior, wherein the sensor unit comprises a detection circuit that is insert molded in a plastic member, the door handle main body is provided with a U-shaped cross section defining the opening of the main body hollow interior, and the retaining member is provided with a U-shaped cross section, the retaining member being received in the door handle main body with the open end thereof facing inward in the main body hollow interior.

2. A vehicle door handle device according to claim 1, wherein the retaining member is provided with a retaining portion for retaining an electric component.

3. A vehicle door handle device according to claim 2, wherein the electric component comprises an illuminating lamp for illuminating a part of a door panel surface opposing the door handle main body.

4. A vehicle door handle device according to claim 2, wherein a hole is jointly defined by the door handle main body and the retaining member, and the electric component is held in the hole jointly defined by the door handle main body and the retaining member.

5. A vehicle door handle device according to claim 4, wherein the electric component comprises an illuminating lamp for illuminating a part of a door panel surface opposing the door handle main body.

6. A vehicle door handle device according to claim 1, wherein a metallic component is provided in association with the door handle device, a part of the metallic component being adjacent to the sensor unit, and the metallic component being electrically grounded.

7. A vehicle door handle device according to claim 6, wherein the cover closes the opening of the main body hollow interior so as to define an outer profile of a door handle jointly with the door handle main body, wherein the cover comprises the metallic component.

8. A vehicle door handle device according to claim 6, wherein the metallic component is connected to an intermediate point of a ground line of an electronic component provided in association with the door handle device.

9. A vehicle door handle device according to claim 1, wherein the cover closes the opening of the main body hollow interior so as to jointly define an outer profile of a door handle jointly with the door handle main body.

10. A vehicle door handle device, comprising:

a door handle main body elongated in a first direction and defining a main body hollow interior, the main body hollow interior having an opening on one side thereof;

a cover separate from and independent of the main body, the cover elongated in the first direction and fixed to the main body so as to close the opening on the one side of the main body;

a retaining member separate from and independent of the main body and cover, the retaining member having an outer profile that fits into the main body hollow interior from the opening of the hollow interior, the retaining member having a retaining member hollow interior; and a sensor unit separate from and independent of the retaining member, the sensor unit having an outer profile that is sized and shaped to closely fit within the retaining member hollow interior and to adjoin and confront an inner surface of the main body hollow interior, wherein the sensor unit comprises a detection circuit that is insert molded in a plastic member;

wherein the cover closes the opening of the main body hollow interior so as to define an outer profile of a door handle jointly with the door handle main body and;

wherein the opening of the main body hollow interior faces downward.

11. A vehicle door handle device comprising a main body formed to provide an elongate closed shell comprising a hollow interior space, an elongate retaining member disposed within the hollow interior space of the main body, the retaining member sized and shaped such that the outer surface of the retaining member closely contacts an inner surface of the main body, and such that a groove is formed in an upper face of the retaining member that extends an entire length of the retaining member along the elongated direction of the retaining member, a sensor encased within a plastic sensor housing, wherein the sensor housing is sized and shaped to correspond to the size and shape of the groove such that an outer surface of the sensor housing closely contacts both the inner surface of the groove and the inner surface of the main body, and wherein the main body and the retaining member are each formed having a U-shaped cross section, the retaining member disposed within the hollow interior space of the main body such that an opening of the U-shaped cross section of the retainer is opposed to the opening of the U-shaped cross section of the main body.

12. A vehicle door handle assembly comprising four individual components, the four individual components configured to assemble closely together with substantially no spacing between adjacent components such that the adjacent components serve to structurally reinforce each other, the four individual components comprising, a main body comprising an elongate member having a generally U-shaped cross-section opening downward;

a lower cover fixed to the main body so as to close the downward-facing opening thereof, the main body and the lower cover cooperating to form an elongate closed shell, an elongate retaining member disposed in a hollow interior space within the main body, the retaining member sized and shaped such that the outer surface thereof closely contacts an inner surface of the main body, and such that a groove is formed in an upper face thereof that extends an entire length of the retaining member along the elongated direction of the retaining member, the groove opening toward the inner surface of the main body, a sensor encapsulated within a plastic sensor housing, the sensor disposed within the groove, the sensor housing sized and shaped to correspond to the size and shape of the groove such that an outer surface of the sensor housing closely contacts the inner surface of the groove and the inner surface of the main body.

13. The vehicle door handle assembly of claim 12, wherein the plastic sensor housing is formed as an elongate plate member having a slight curve along the direction of elongation.

* * * * *